United States Patent
Gruenbacher et al.

(10) Patent No.: US 9,579,597 B2
(45) Date of Patent: *Feb. 28, 2017

(54) AIR FILTERING DEVICE

(71) Applicant: The Procter & Gamble Company, Cincinnati, OH (US)

(72) Inventors: Dana Paul Gruenbacher, Fairfield, OH (US); Steven James Schroeck, Cincinnati, OH (US); Jessica Elizabeth Leon, Bellevue, KY (US); Paolo Dal Bo, Frankfurt (DE); Uwe Schober, Glashutten (DE)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/273,598

(22) Filed: May 9, 2014

(65) Prior Publication Data
US 2014/0331625 A1    Nov. 13, 2014

Related U.S. Application Data

(60) Provisional application No. 61/821,351, filed on May 9, 2013.

(51) Int. Cl.
| | | |
|---|---|---|
| *B01D 46/02* | (2006.01) | |
| *B01D 46/46* | (2006.01) | |
| *B01D 17/00* | (2006.01) | |
| *B01D 46/44* | (2006.01) | |

(52) U.S. Cl.
CPC .......... *B01D 46/02* (2013.01); *B01D 2273/30* (2013.01)

(58) Field of Classification Search
CPC .. B01D 46/46; B01D 46/008; B01D 46/0028; B01D 17/00; B01D 46/0016; B01D 46/44; B01D 46/42; B01D 46/0086; A24F 19/0042
USPC ............. 55/385.1, 385.2, 472, 473, DIG. 34; 95/25, 26, 273; 96/424, 397, 417, 422
See application file for complete search history.

(56) References Cited

U.S. PATENT DOCUMENTS

| | | |
|---|---|---|
| 2,272,394 A | 2/1942 | Armstrong |
| 3,864,106 A | 2/1975 | Brandt |
| 4,018,235 A * | 4/1977 | Smith ................... A24F 19/025 131/236 |
| 4,350,507 A | 9/1982 | Greenough |
| 4,417,908 A | 11/1983 | Pitcher |

(Continued)

FOREIGN PATENT DOCUMENTS

| | | |
|---|---|---|
| FR | 2848873 | 6/2004 |
| GB | 1 019 735 A | 2/1966 |

(Continued)

OTHER PUBLICATIONS

International Search Report for Application No. PCT/US2014/037427, dated Nov. 5, 2014, containing 9 pages.

(Continued)

*Primary Examiner* — Jacob T Minskey
*Assistant Examiner* — Minh-Chau Pham
(74) *Attorney, Agent, or Firm* — Abbey A. Lopez; Amy I. Ahn-Roll

(57) ABSTRACT

A device for filtering air having a base, a fan functionally attached to the base, an air filter releasably attached to the base, and a substantially air impermeable outer sleeve is provided.

18 Claims, 8 Drawing Sheets

(56) References Cited

U.S. PATENT DOCUMENTS

| | | | |
|---|---|---|---|
| 4,480,649 A | 11/1984 | Hayes | |
| 4,934,396 A | 6/1990 | Vitta | |
| 5,106,488 A | 4/1992 | Jonasson | |
| 5,141,539 A * | 8/1992 | Hiouani | A24F 19/0042 55/385.1 |
| 5,163,985 A | 11/1992 | Chen | |
| 5,165,395 A | 11/1992 | Ricci | |
| 5,169,420 A | 12/1992 | Chen | |
| 5,230,720 A * | 7/1993 | Kendall | B01D 46/008 55/385.1 |
| 5,456,836 A | 10/1995 | Jeffery | |
| 5,545,492 A | 8/1996 | Zito | |
| 6,174,340 B1 | 1/2001 | Hodge | |
| 6,242,725 B1 | 6/2001 | Murata et al. | |
| 6,660,070 B2 * | 12/2003 | Chung | B01D 46/008 55/385.2 |
| 6,875,248 B1 | 4/2005 | Shelton | |
| 6,939,397 B2 | 9/2005 | Nelsen et al. | |
| 7,837,958 B2 | 11/2010 | Crapser et al. | |
| 7,874,039 B2 | 1/2011 | Lin | |
| 9,044,700 B2 * | 6/2015 | Gruenbacher | B01D 46/42 |
| 2002/0187703 A1 | 12/2002 | Pearce | |
| 2004/0020363 A1 * | 2/2004 | LaFerriere | B01D 46/0028 95/273 |
| 2004/0040901 A1 * | 3/2004 | Page | B01D 17/00 210/163 |
| 2004/0093756 A1 * | 5/2004 | Carlucci | A45D 20/12 34/82 |
| 2004/0112019 A1 | 6/2004 | Mountford | |
| 2004/0182245 A1 | 9/2004 | Gorin | |
| 2005/0091946 A1 | 5/2005 | Cheng | |
| 2005/0229562 A1 | 10/2005 | Dallas et al. | |
| 2006/0130446 A1 | 6/2006 | Herbst | |
| 2007/0272082 A1 | 11/2007 | Johansson | |
| 2008/0257149 A1 | 10/2008 | Ogale | |
| 2008/0274312 A1 | 11/2008 | Schelling | |
| 2009/0038480 A1 | 2/2009 | Garman et al. | |
| 2009/0044705 A1 | 2/2009 | Takayanagi et al. | |
| 2009/0139404 A1 | 6/2009 | Sheehan | |
| 2010/0058927 A1 | 3/2010 | Krantz | |
| 2010/0064895 A1 | 3/2010 | Thurin et al. | |
| 2010/0159770 A1 | 6/2010 | Walser | |
| 2010/0187108 A1 | 7/2010 | Matsumoto | |
| 2010/0300054 A1 | 12/2010 | Cole et al. | |
| 2010/0319310 A1 | 12/2010 | Smith | |
| 2011/0259813 A1 | 10/2011 | Wertz et al. | |
| 2012/0180666 A1 | 7/2012 | Lim | |
| 2014/0170367 A1 | 6/2014 | Turner | |
| 2014/0331622 A1 | 11/2014 | Gruenbacher et al. | |
| 2014/0331623 A1 * | 11/2014 | Gruenbacher | B01D 46/0016 55/364 |
| 2014/0331859 A1 * | 11/2014 | Gruenbacher | B01D 46/44 95/26 |
| 2015/0352480 A1 * | 12/2015 | Morison | B01D 46/0086 96/417 |
| 2016/0175754 A1 | 6/2016 | Morison | |

FOREIGN PATENT DOCUMENTS

| | | |
|---|---|---|
| JP | 2002143621 | 5/2002 |
| JP | A-2009-035405 | 2/2009 |

OTHER PUBLICATIONS

Office Actions for P&G Case; U.S. Appl. No. 14/273,594.
Office Actions for P&G Case; U.S. Appl. No. 14/273,607.
Office Actions for P&G Case; U.S. Appl. No. 14/273,611.

* cited by examiner

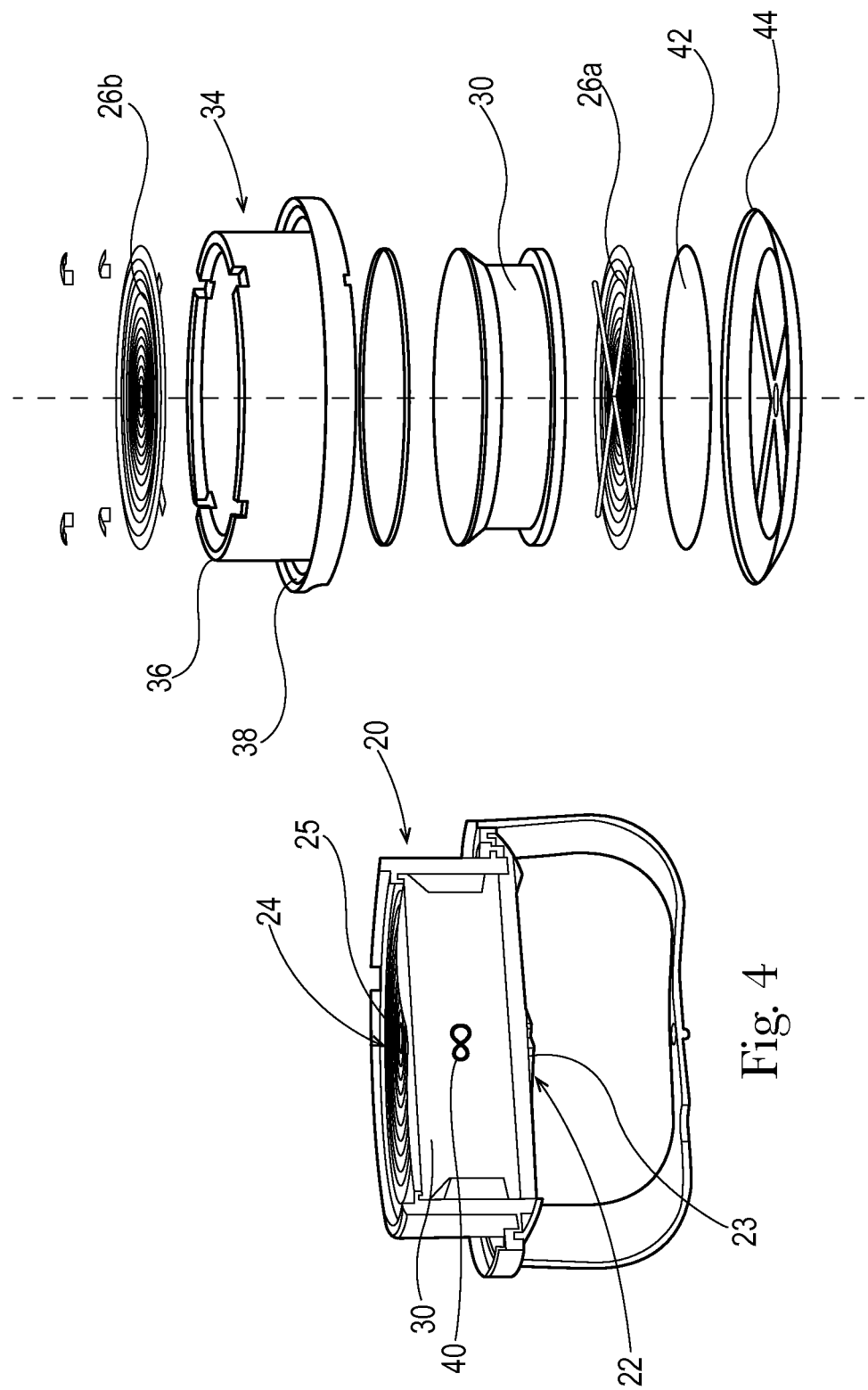

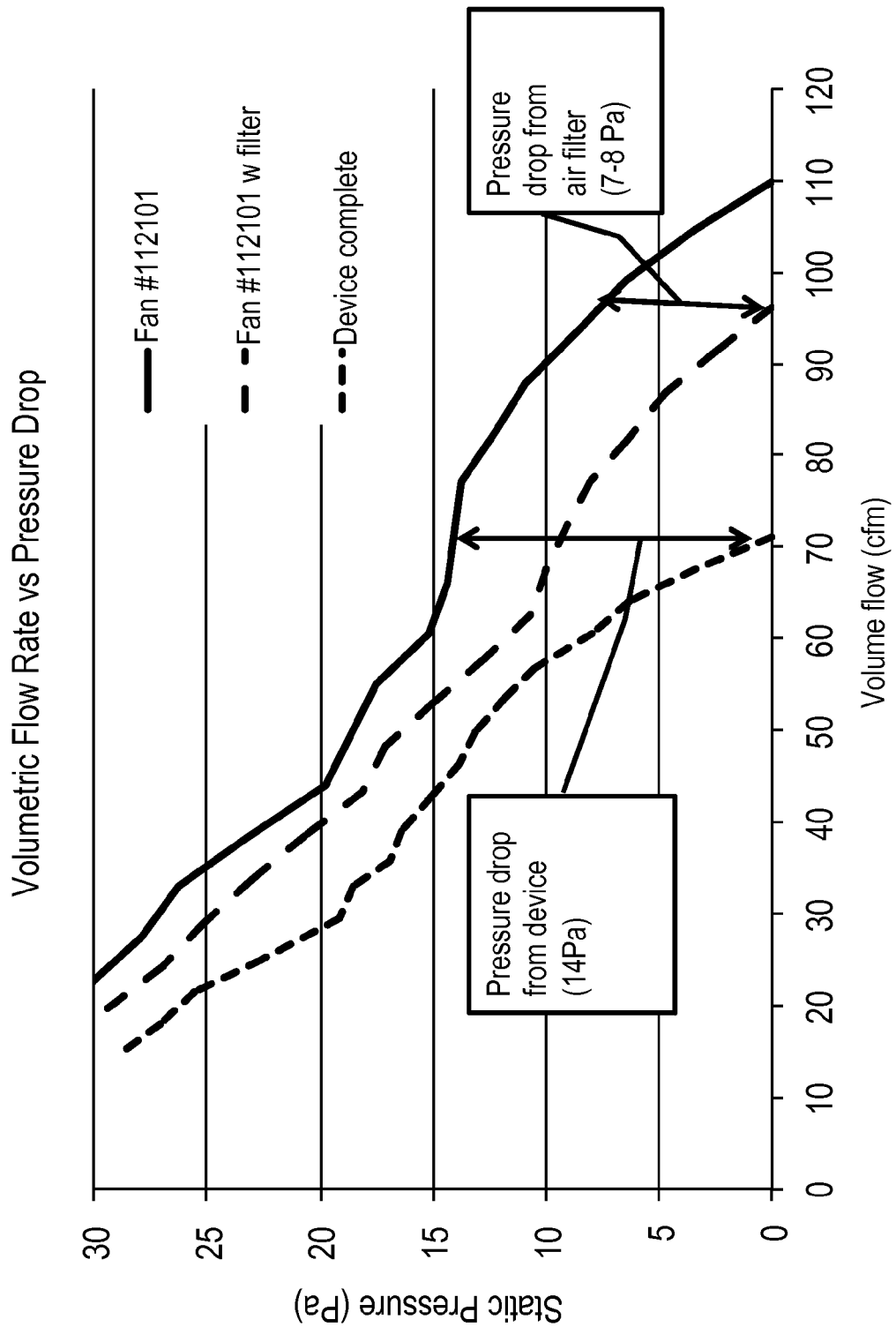

AIR FILTERING DEVICE

FIELD OF THE INVENTION

The present invention is directed to an air filtering device that filters dust and particulates from an incoming air stream to reduce particulates in the filtered airstream.

BACKGROUND OF THE INVENTION

Air includes many pollutants such as odors (e.g. cigarette smoke), VOCs, microbials (e.g. bacteria, viruses, mold), particulates (e.g. dust), that have a pernicious effect when inhaled or otherwise contacted by human beings. Particulates alone comprise dead skin, pet dander, dust mite feces, and other microscopic (less than 5 microns in size) particulates which may elicit a human immune response.

There are several air filtering devices known in the art that are intended to remove particulates from the air. Often times, such air filtering devices are large/bulky or utilize rigid outer housings. Attempts have been made to reduce parts and/or decrease size for convenience, cost, and/or transportability advantages. One such device is described in US 2009/0038480, assigned to Hamilton Beach Brands, Inc. ("HB"). The HB device is an air purifier having an impeller housed within a base and having a foldable air filter bag that is removably mountable to the base. The impeller urges air through the air filter bag to remove particles from the air. In some embodiments, the HB device includes a readily air pervious or permeable outer cover that is slipped over a frame surrounding the air filter. The outer cover is said to provide an aesthetically pleasing appearance to the air purifier and provides support to the air.

One drawback with previous air filtering devices may be the low exit velocity of air exiting the device which affects filtering performance. Air filtering devices that achieve a sufficient exit velocity for filtering desired particulate levels may require a higher powered fan which could make the device noisy or require a rigid device housing that adds to the large size and cost of the device.

Accordingly, there continues to be a need for an improved air filtering device and method of filtering air which cost-effectively removes particulates from the air and includes consumer-friendly features such as transportability and consumer acceptable noise levels.

SUMMARY OF THE INVENTION

According to one embodiment of the invention, there is provided an air filtering device comprising a base having an air inlet and an air outlet; a fan functionally attached to said base, wherein said fan moves about 70 to about 150 CFM of air through said air outlet, at about 4 to about 25 Pa of pressure, when said fan is activated; an air filter in air flow communication with said air outlet; a substantially air impermeable outer sleeve comprising a first open end, a second open end, and an air flow path therebetween, wherein said outer sleeve is in air flow communication with said air outlet and is releasably attached to said base at said first open end, and wherein said outer sleeve envelops said air filter around its longitudinal axis; wherein the exit velocity of a volume of air exiting said second open end of said outer sleeve is about 0.6 to about 2.6 m/s when said device is activated.

BRIEF DESCRIPTION OF THE DRAWINGS

While the specification concludes with the claims particularly pointing out and distinctly claiming the invention, it is believed that the present invention will be better understood from the following description taken in conjunction with the accompanying drawings in which:

FIG. 4 shows the cross-sectional view of the device in FIG. 2, showing only the base of the device (i.e. device with the outer sleeve, air filter, and related parts removed);

FIG. 5 is an exploded view of the base in FIG. 4;

FIG. 10 is a graph showing the static pressure and air flow rates of a fan only, a device with fan and air filter only, and an entire air filtering device, in accordance with the present invention.

DETAILED DESCRIPTION OF THE INVENTION

Figure 2:
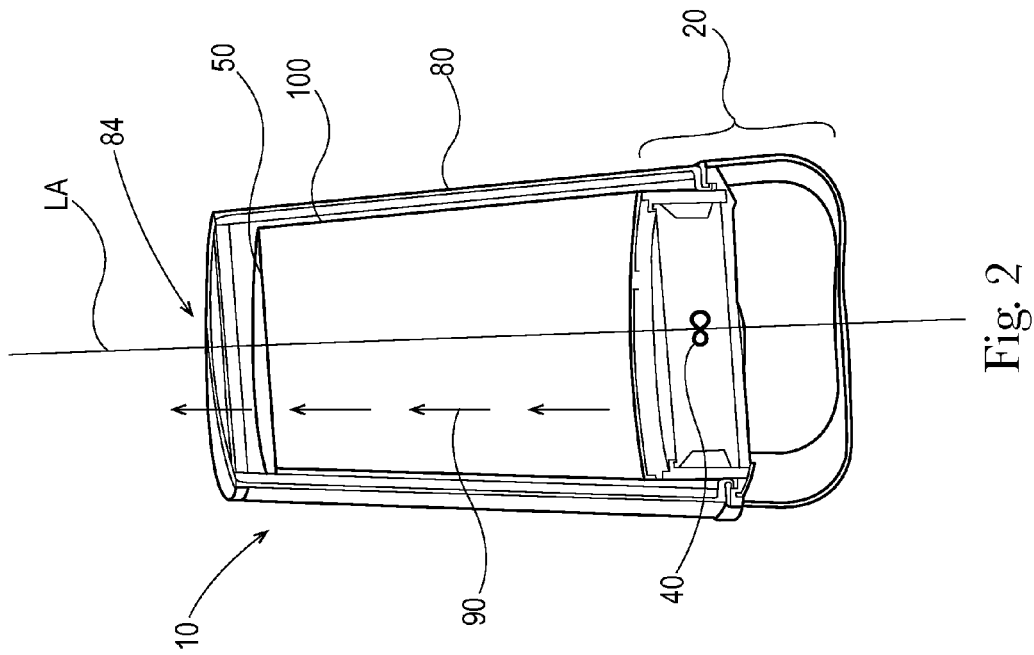
FIG. 2 shows a cross-sectional view of the air filtering device in FIG. 1.
Figure 1:
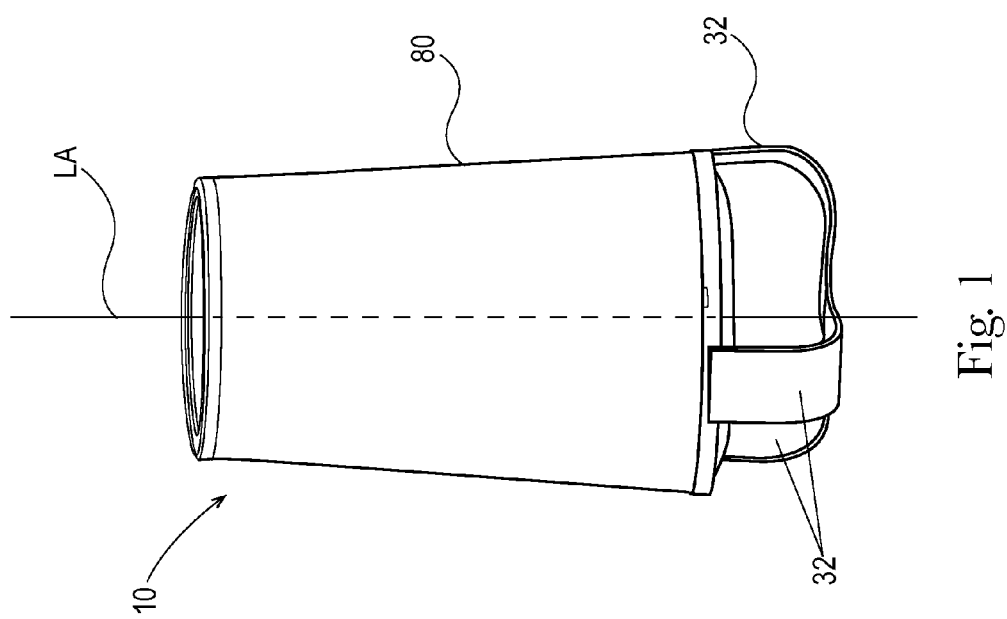
FIG. 1 shows one embodiment of an air filtering the device in accordance with the present invention.
Figure 3:
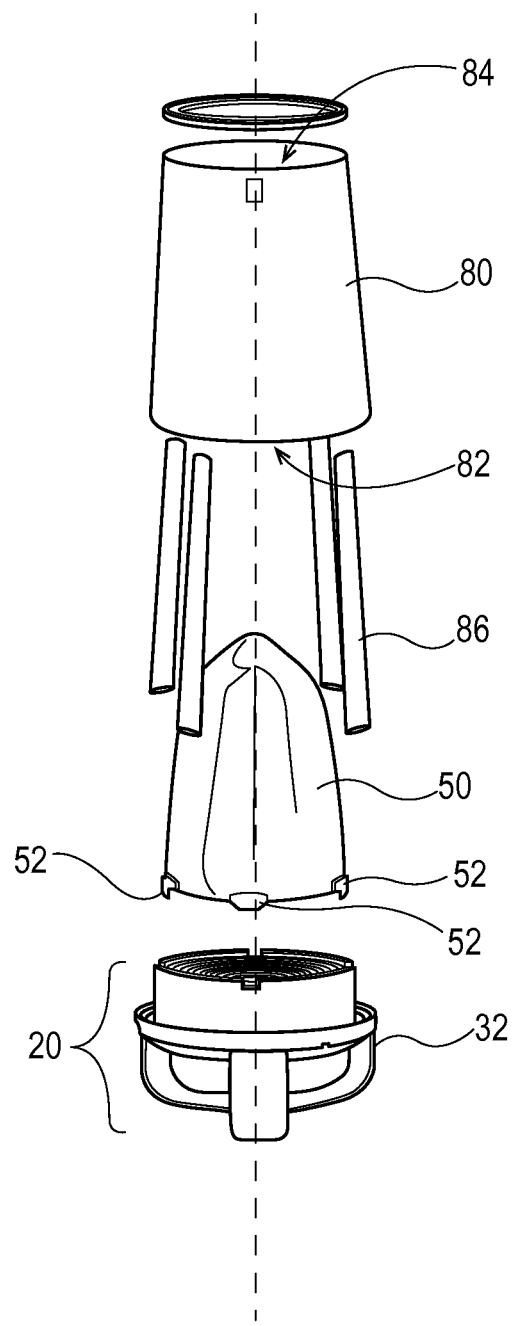
FIG. 3 shows an exploded view of the air filtering device in FIG. 1.

Referring to FIGS. 1-3, an exemplary embodiment of a device 10 for filtering air is shown. The device 10 may include a base 20, a fan 40 functionally attached to the base, an air filter 50 releasably attached to the base, and a substantially air impermeable outer sleeve 80. The device 10 may be powered by replaceable or rechargeable batteries, an AC outlet (directly AC driven or an adequate AC to DC power supply), a car DC power source, a solar cell, or the like.

As input air having particulates or other contaminants, which may range in size from about 0.1 microns to about 30 microns, enters the device 10, the input air is filtered through the air filter 50, thus reducing particulates in the output air.

The device 10 may be sized such that it can be used on a table top or in a living space such as a room having about 22 $m^3$ to about 75 $m^3$ of space. The device 10 may have a smaller footprint than its upright height along the longitudinal axis LA to be suitable for small spaces. For example, when in its upright position, the device may be about 20 cm to about 30 cm wide, about 20 cm to about 30 cm deep, and about 45 cm to about 75 cm tall along the longitudinal axis LA. The height of the device 10 may be reduced during storage where collapsible parts are used.

The device 10 may be characterized by air flow, air filter properties, and device configuration (e.g. housing, grill covers, air filter, and outer sleeve configuration). Such aspects lead to a pressure drop within the device 10. In one embodiment, the device 10 may result in a total pressure drop of about 15 Pa to about 25 Pa, or about 8 Pa to about 20 Pa. Other embodiments may have higher or lower pressure drops leading to higher or lower air flow requirements for the fan 40 in order to lead to the same air flow of the device 10.

Each of the parts that may be included in the device 10 of the present invention is described in more detail below.

Device Parts

Base and Fan

Referring to FIGS. 4-5, the device 10 of the present invention may include a base 20 constructed of any known material to stabilize a motorized fan 40. The base 20 may include a fan housing 30 and legs 32 supporting the fan housing and raising the fan housing from a supporting surface to facilitate air flow into an air inlet 22 when the air inlet is located an on underside of the base. The base 20, with legs 32, may be about 5 cm to about 10 cm tall and about 20 cm to about 30 cm in diameter to reduce part weight. The base 20 has an air inlet 22 on a first side 23 of the base and an air outlet 24 on a second side 25 of the base. In some embodiments, the base 20 may include grill covers 26a, 26b corresponding to the air inlet 22 and air outlet 24, and, optionally, a fan pre-filter 42 and fan cover 44 for filtering large particles (e.g. hair) to help keep the fan clean.

The base 20 may have a tapered shroud 34 with a first step 36 to enable attachment of an air filter 50 and a second step 38 for attachment of an outer sleeve 80. The second step 38 may be lower on the shroud 34 of the base 20, circumferencing the first step 36. The shroud 34 may have a diameter at the top of about 16 cm to about 25 cm, expanding downward to about 20 cm to about 30 cm.

A fan 40 is functionally attached to the base 20 such that it assists with drawing a volume of input air into the air inlet 22 of the base and out through the air outlet 24, pushing the volume of air through an air flow path 90 defined by the outer sleeve 80 and through the air filter 50, also located in the air flow path 90. The fan 40 may be mounted inside the base 20 between the first side 23 and the second side 25 of the base 20. In some embodiments, the fan 40 can be placed downstream of an air filter 50 such that a volume of air is pulled through an air filter (vs. pushed through the air filter) and the air filter cleans the air before passing over the fan 40. "Downstream", as used herein, means a position in an airflow path that is later in time from a referenced position, when measuring air flow through an air filtering device.

The fan 40 may include a fan blade and motor. The rotating fan blade may be at least about 5 cm from the surface upon which the device 10 rests to avoid a high pressure drop in urging air into the air flow path 90 and also to minimize drawing in undesirable quantities of debris (e.g. dirt/hair). The fan 40 may be activated or powered by a power source providing less than about 25 Watts, or less than about 15 Watts, or less than about 8 Watts, or less than about 6 Watts of power to the fan.

The fan 40 may be set at a predetermined speed to provide a desired air flow rate or may be set by a control having user-selected speeds. The fan 40, when activated without the air filter 50 or outer sleeve 80, may provide from about 70 to about 150 cubic feet per minute ("CFM"), or about 85 to about 130 CFM, or about 100 to about 120 CFM, of air.

In one embodiment, an axial fan is mounted in the base 20. Where an axial fan is used, the desired axial fan blade (also called impeller) diameter can be measured from tip to tip at outer most point of the blade and may have a diameter of about 10 cm to about 25 cm, or about 15 cm to about 25 cm, or about 17 cm to about 20 cm, and is combined with an AC or DC motor, fan housing 30, and fan speed that delivers, without the air filter 50 or outer sleeve 80, about 70 to about 150 CFM, or about 85 to about 130 CFM, or about 100 to about 120 CFM, of air. Suitable axial fans include Silverstone S1803212HN available from Conrad Electronics, Orion OD180APL-12LTB available from Allied Electronics, and EBM Pabst 6212 NM available from RS Components Intl. Axial fans may be significantly quieter than centrifugal fans typically used in air filtering devices.

Air Filter

Referring again to FIGS. 1-3, the air filter 50 of the present invention longitudinally extends from the base 20 and is in air flow communication with the air outlet 24 of the base 20. The air filter 50 may include at least one attachment member 52 which releasably attaches the air filter 50 to the base 20. The attachment member 52 may be in the form of clips, elastic bands, gripping materials, hook and loop fasteners, and the like. One fastening approach is to provide a tab that engages a mechanical switch that is electrically connected to the fan 40 to power it on when the air filter 50 is properly engaged.

The air filter 50 may have an air flow surface area of about 0.1 m$^2$ to about 1 m$^2$ (about 1.08 ft$^2$ to about 10.76 ft$^2$), or about 0.1 m$^2$ to about 0.6 m$^2$ (about 1.08. ft$^2$ to about 6.46 ft$^2$), or about 0.15 m$^2$ to about 0.5 m$^2$ (about 1.61 ft$^2$ to about 5.38 ft$^2$), or about 0.2 m$^2$ to about 0.4 m$^2$ (about 2.15 ft$^2$ to about 4.31 ft$^2$). The air flow surface area, as used herein, is the permeable area from which air flows through the air filter 50. This air flow surface area is measured by laying the air filter 50 out flat on a single plane without any folds or pleats and then measuring the total surface area. The measured air flow surface area of the air filter 50 may not include any areas where a physical or chemical barrier (e.g. a structure or coating on an edge of the filter) prevents air flow through that part of the air filter. Using an air filter with more air flow surface area may be desirable as it enables a lower face velocity of air through the filter 50 which lowers the pressure drop. This enables a higher air flow rate (i.e. CFM) from the fan 40 for a given amount of power. Higher air flow surface area also enables a quieter device since less power is needed from the fan 40.

The air filter 50 of the present invention may have an average face velocity of about 6 fpm to about 60 fpm (about 1.83 m/min to about 18.29 m/min), or about 25 fpm to about 50 fpm (about 7.62 m/min to about 15.24 m/min), or about 25 to about 40 fpm (about 7.62 m/min to about 12.19 m/min) In one embodiment, the air filter face velocity is about 36 fpm (about 10.97 m/min). Air filter face velocity is the velocity of air as it exits the outer face of the air filter. The air filter's outer face is downstream of the air filter's inner face such that air flows from the inner face to the outer face of the air filter 50. In configurations where air is routed directly from the fan to the air filter (i.e. air does not escape between the fan and an entrance point to air filter), as in the present invention, air filter face velocity is calculated:

$$\text{Filter Face Velocity} = \frac{\text{Volumetric Flow rate } (CFM) \text{ through the air inlet of fan}}{\text{Airflow surface area of the air filter (ft}^2)}$$

The air filter 50 of the present invention may be formed from a single fibrous layer or multiple layers. The air filter 50 may comprise a non-woven. "Non-woven", as used herein and as defined by EDANA (European Disposables and Non-woven Association) means a sheet of fibers, continuous filaments, or chopped yarn of any nature or origin, that have been formed into a web by means, and bonded together by any means, with the exception of weaving or knitting. The non-woven may be composed of synthetic fibers or filaments or natural fibers or fibers post-consumer recycled material such as polyolefins (e.g., polyethylene and polypropylene), polyesters, polyamides, synthetic cellulosics (e.g., RAYON®), and blends thereof. Also useful are natural fibers, such as cotton or blends thereof. Non-limiting examples of how the non-woven can be formed include meltblowing, carded spunlace, carded resin bonding, needle punch, wet laid, air laid, spunbond, and combinations thereof. A non-woven air filter may have a basis weight of about 20 to about 120 gsm, where the basis weight of the non-woven or filter media is measured according to the following method that follows a modified EDANA 40.390 (February 1996) method.

1. Cut at least 3 pieces of the non-woven or filter media to specific known dimensions, preferably using a pre-cut metal die and die press. Each test piece typically has an area of at least 0.01 m².
2. Use a balance to determine the mass of each test piece in grams; calculate basis weight (mass per unit area), in grams per square meter ("gsm") using:

$$\text{Basis Weight} = \frac{\text{Mass of Test Piece (g)}}{\text{Area of Test Piece (m}^2\text{)}}$$

3. Report the numerical average basis weight for all test pieces.
4. If only a limited amount of non-woven or filter media is available, basis weight may be measured and reported as the basis weight of one piece, the largest rectangle possible.

The air filter 50 according to the present invention may be made according to commonly assigned U.S. Pat. Nos. 6,305,046; 6,484,346; 6,561,354; 6,645,604; 6,651,290; 6,777,064; 6,790,794; 6,797,357; 6,936,330; D409,343; D423,742; D489,537; D498,930; D499,887; D501,609; D511,251 and/or D615,378. The degree of hydrophobicity or hydrophilicity of the fibers may be optimized depending upon the desired goal of the air filter, either in terms of type of particulate or malodor to be removed, the type of additive that is provided, biodegradability, availability, and combinations of such considerations.

In one embodiment, the air filter 50 is a three layer non-woven comprising a pre-filter layer, a functional layer and a support layer. In this approach, the pre-filter layer is on the upstream side of the air filter 50 and acts as screen for larger particulates (e.g. greater than 10 microns). "Upstream", as used herein, means a position in an air flow path 90 that is earlier in time from a referenced position, when measuring air flow through an air filtering device. The pre-filter layer is comprised of a high loft structure including hydroentangled polyester, polypropylene ("PP"), or mixtures thereof. The functional layer catches smaller particles (e.g. less than about 2.5 microns) and may serve as the layer comprising any malodor treatment agents. The functional layer may be made from melt-blown or spun-bonded non-woven. The support layer may include high contrast bonded/unbonded areas for visual indication of the air filter collecting particles. The supporting layer provides the structure/rigidity desired for the air filter 50. The supporting layer may be made from scrim or aperture film The type of non-woven and manufacturing method chosen may have a large impact on air filter efficiency and on pressure drop and, in turn, pressure needed from the fan 40 to deliver about 50 to about 150 CFM of air from the device 10. One material with suitable filtering and low pressure drop is a 60 gsm hydroentangled non-woven comprised of polyethylene terephthalate ("PET") fibers with a 10-20 gsm spunbond PP layer to provide structure/support for the hydroentangled PET fibers (collectively referred to herein as "60 gsm HET"). With the hydroentangling process, one can achieve a 1 mm to 3 mm thickness with this construction which enables a lower pressure drop for the same basis weight. Thickness is measured according to the following method that follows a modified EDANA 30.5-90 (February 1996) method.

1. Equipment set-up should include
    a. Foot Diameter: 40.54 mm (1.596 inch)
    b. Foot Area: 12.90 cm² (2 in²)
    c. Foot Weight: 90.72 grams (0.2 lbs.)
    d. Foot Pressure: 7.03 grams/cm² (0.1 psi, 0.69 kPa)
    e. Dwell time: 10 s
2. Measure at least 4 locations, ideally 10. All should be single layer and without creases. Do not smooth, iron or tension the material to remove creases. Test pieces need to be larger than the area of the pressure foot
3. Place the uncreased sample under the pressure foot for dwell time and measure thickness in mm.
4. Report the numerical average for all test pieces.

It has been found that an air filter density <60 kg/m³ may be desired to provide meaningful efficiency while also having low pressure drop. With the 60 gsm HET material a density from about 20 to about 60 kg/m³ may be provided. This results in a non-woven that delivers good air filter efficiency and low pressure drop for the device 10 described herein. This is because the fibers are spread out through the thickness enabling more air flow pathways, resulting in less fiber to fiber contact and more available fiber surface area to capture particles. Other ways to achieve thickness for a given basis weight include but are not limited to air bonding, airlaid, needle punching, and carded resin bonded materials. The density of the air filter 50 is calculated using the following equation:

$$\text{filter density} = \frac{\text{basis weight} \left(\frac{g}{m^2}\right)}{\text{thickness (m)}}$$

Another non-woven with good filtering but higher pressure drop is a 59 gsm spun bond/melt-blown/spun bond ("SMS") laminate comprising 10 gsm PP spunbond, bonded to a 34 gsm PP melt-blown, bonded to another 17 gsm PP spunbond non-woven (collectively referred to herein as "59 SMS"). Both materials have a similar basis weight but have very different thicknesses and densities and, hence, pressure drops. The 60 gsm HET material has a thickness from about 1 mm to about 3 mm, whereas the 59 SMS structure has a thickness less than about 1 mm, resulting in a density greater than 60 kg/m³. The 60 gsm HET material has a lower single pass efficiency but also has a pressure drop that is 2 to 3 times lower enabling a higher air flow rate, lower noise, or less power required for a given fan. The 60 gsm HET material or any material with a density less than about 60 kg/m³ also has the advantage of being able to hold more dirt/particulates than a more dense filter, such as a melt-blown or SMS material, before it starts to restrict air flow that again could impact air flow rate for a fan over the life of the air filter.

The pore volume distribution of the non-woven characterizes the porosity of the non-woven. It has been found that a non-woven with a preferable pore volume distribution has at least about 15% of the total volume in pores of radii less than about 50 µm, at least about 40% of the total volume in pores of radii between about 50 µm to about 100 µm, and at least about 10% of the total volume in pores of radii greater than about 200 µm, where the pore volume distribution is calculated using measurements from the Cumulative Pore Volume Test Method shown below.

Cumulative Pore Volume Test Method

The following test method is conducted on samples that have been conditioned at a temperature of 23° C.±2.0° C. and a relative humidity of 45%±10% for a minimum of 12 hours prior to the test. All tests are conducted under the same environmental conditions and in such conditioned room. Discard any damaged product. Do not test samples that have defects such as wrinkles, tears, holes, and like. All instruments are calibrated according to manufacturer's specifications. Samples conditioned as described herein are considered dry samples (such as "dry fibrous sheet") for purposes of this invention. At least four samples are measured for any given material being tested, and the results from those four replicates are averaged to give the final reported value. Each of the four replicate samples has dimensions of 55 mm×55 mm.

Pore volume measurements are made on a TRI/Autoporosimeter (Textile Research Institute (TRI)/Princeton Inc. of Princeton, N.J., U.S.A.). The TRI/Autoporosimeter is an automated computer-controlled instrument for measuring pore volume distributions in porous materials (e.g., the volumes of different size pores within the range from 1 to 1000 µm effective pore radii). Computer programs such as Automated Instrument Software Releases 2000.1 or 2003.1/2005.1; or Data Treatment Software Release 2000.1 (available from TRI Princeton Inc.), and spreadsheet programs are used to capture and analyze the measured data. More information on the TRI/Autoporosimeter, its operation and data treatments can be found in the paper: "Liquid Porosimetry: New Methodology and Applications" by B. Miller and I. Tyomkin published in The Journal of Colloid and Interface Science (1994), volume 162, pages 163-170, incorporated here by reference.

As used in this application, porosimetry involves recording the increment of liquid that enters or leaves a porous material as the surrounding air pressure changes. A sample in the test chamber is exposed to precisely controlled changes in air pressure. As the air pressure increases or decreases, different size pore groups drain or absorb liquid. Pore-size distribution or pore volume distribution can further be determined as the distribution of the volume of uptake of each pore-size group, as measured by the instrument at the corresponding pressure. The pore volume of each group is equal to this amount of liquid, as measured by the instrument at the corresponding air pressure. Total cumulative fluid uptake is determined as the total cumulative volume of fluid absorbed. The effective radius of a pore is related to the pressure differential by the relationship:

Pressure differential=[(2)γ cos Θ]/effective radius where γ=liquid surface tension, and Θ=contact angle.

This method uses the above equation to calculate effective pore radii based on the constants and equipment controlled pressures.

The automated equipment operates by changing the test chamber air pressure in user-specified increments, either by decreasing pressure (increasing pore size) to absorb liquid, or increasing pressure (decreasing pore size) to drain liquid. The liquid volume absorbed or drained at each pressure increment is the cumulative volume for the group of all pores between the preceding pressure setting and the current setting. The TRI/Autoporosimeter reports the pore volume contribution to the total pore volume of the specimen, and also reports the volume and weight at given pressures and effective radii. Pressure-volume curves can be constructed directly from these data and the curves are also commonly used to describe or characterize the porous media.

In this application of the TRI/Autoporosimeter, the liquid is a 0.2 weight % solution of octylphenoxy polyethoxy ethanol (Triton X-100 from Union Carbide Chemical and Plastics Co. of Danbury, Conn.) in 99.8 weight % distilled water (specific gravity of solution is about 1.0). The instrument calculation constants are as follows: ρ (density)=1 g/cm$^3$; γ (surface tension)=31 dynes/cm; cos Θ=1. A 1.2 µm Millipore Mixed Cellulose Esters Membrane (Millipore Corporation of Bedford, Mass.; Catalog #RAWP09025) is employed on the test chamber's porous plate. A plexiglass plate weighing about 32 g (supplied with the instrument) is placed on the sample to ensure the sample rests flat on the Millipore Filter. No additional weight is placed on the sample.

A blank condition (no sample between plexiglass plate and Millipore Filter) is run to account for any surface and/or edge effects within the test chamber. Any pore volume measured for this blank run is subtracted from the applicable pore grouping of the test sample. For the test samples, a 4 cm×4 cm plexiglass plate weighing about 32 g (supplied with the instrument) is placed on the sample to ensure the sample rests flat on the Millipore filter during measurement. No additional weight is placed on the sample.

The sequence of pore sizes (pressures) for this application is as follows (effective pore radius in µm): 10, 20, 30, 40, 50, 60, 70, 80, 90, 100, 120, 140, 160, 180, 200, 220, 240, 260, 280, 300, 350, 400, 450, 500, 550, 600, 650, 700, 750, 800.

These pressure values are used to produce the Advancing 1 and Receding 1 curves. This sequence starts with the sample dry, saturates it as the pressure decreases (i.e., Advancing 1 curve), and then subsequently drains the fluid out as the pressure increases again (i.e., Receding 1 curve).

The TRI/Autoporosimeter measures the cumulative weight (mg) of liquid at each pressure level, and reports the respective cumulative pore volume of the sample. From these data and the weight of the original dry sample, the ratio of cumulative pore volume/sample weight can be calculated at any measured pressure level, and reported in mm$^3$/mg. In the case of this test method, the cumulative pore volume is determined during the Receding 1 curve, and is reported in mm$^3$/mg and taken from the TRI instrument.

High thickness and low density at similar basis weights enables a filter material to have good air flow while also still having a lot of fiber surface area to electrostatically attract and/or mechanically filter particles. This electrostatic benefit can be further enhanced by leveraging PP fibers or other materials/coatings that are negatively changed in the triboelectric series to help attract positively charged particles like hair, skin, and cotton. Optionally, the air filter material can be electrostatically charged via corona treatment at the manufacturing site to help the material maintain a charge for attracting small particulates when the fan blows the air through the filter material. Another approach that may deliver improved particle pick-up is ionization in the device to help create a charge on the particles in the air such that the particles are attracted to the filter material when air with particles is passed through the air filter 50 via the fan 40.

The air filter 50 of the present invention may have a total aggregate basis weight of at least about 30 g/m², alternatively at least about 50 g/m², alternatively at least about 70 g/m². The total aggregate basis weight of the present air filter 50 is typically no greater than about 200 g/m², alternatively no greater than about 150 g/m², and alternatively no greater than about 100 g/m². The aggregate basis weight can be measured using the basis weight equation described previously.

The air filter 50 may include air treatment agents to improve the particulate removal from the air, freshening the air, providing anti-microbial activity, and/or the like. An air freshening agent may include anti-bacterial, anti-viral, or anti-allergen agents; ionic and non-ionic surfactants; wetting agents; peroxides; ionic and non-ionic polymers, including those described in US 2012/0183488 and US 2012/0183489; metal salts; metal and metal oxides catalysts (e.g. ZPT, Cu, Ag, Zn, ZnO); pH buffering agents; biological agents including enzymes, natural ingredients and extracts thereof; coloring agents; and perfumes, including those described in U.S. Pub. 2011/0150814, U.S. Pat. No. 8,357,359, U.S. Pub. 2013/0085204. It is also contemplated that the air treatment agent may include vitamins, herbal ingredients, or other therapeutic or medicinal actives for the nose, throat, and/or lungs.

In some embodiments, the air filter 50 includes conductive materials and/or carbon particles to help remove odors and/or trap small molecules (VOC's, etc.). The air filter 50 may have high porosity with a substantially flat surface and open cells or apertures that may represent greater than about 50% of the air filter, or about 50%, or about 30%, or about 25%, or about 20%, or about 10%. The void volume within the air filter 50 may consist of tortuous channels formed within the material such as those found in foams, sponges, and filters. The surface area may be in the form of tortuous voids within the volume of the air filter. The surface area to dimensional area ratio may be about greater than about 2, alternatively greater than about 4.

The air filter 50 may comprise an additive. The type and level of additive is selected such that the air filter has the ability to effectively remove and retain particulate material, while maintaining the electrostatic properties of the filter and minimizing the amount of reemission. As such, the additive may be non-cationic, as cationic additives may tend to diminish the electrostatic properties. In one embodiment, the air filter 50 is impregnated with a polymeric additive. Suitable polymeric additives include, but are not limited to, those selected from the group consisting of pressure sensitive adhesives, tacky polymers, and mixtures thereof. Suitable pressure sensitive adhesives comprise an adhesive polymer, which is optionally used in combination with a tackifying resin (e.g. Mirapol™ polymer), plasticizer, and/or other optional components. Suitable tacky polymers include, but are not limited to, polyisobutylene polymers, N-decylmethacrylate polymers, and mixtures thereof. The adhesive characteristics of a polymeric additive may provide effective particulate removal performance. Adhesive characteristics of the polymeric additives can be measured using a texture analyzer. A suitable texture analyzer is commercially available from Stable Micro Systems, Ltd. in Godalming, Surrey UK under the trade name TA.XT2 Texture Analyser.

The air filter 50 of the present invention may have a dirt holding capacity of greater than about 1 gram of dirt or about 3 to about 6 grams of dirt at an air filter face velocity of 20 to 40 feet/min, while increasing pressure drop by less than 12.5 Pa (0.05" water gauge), or the increased pressure drop of the additional dirt on filter is less than 10 Pa, or less than 5 Pa, or less than 3.5 Pa, or less than 2 Pa. The end-of-life of the air filter 50 may be 30 days, 60 days, 90 or more days. Dirt holding capacity and change in pressure drop as a result of adding dirt are measured via a modified ASHRAE 52.1-1992 method.

1. Measure at least 2 samples of the filter media, 6 or more preferably as prescribed by the method.
2. Measurements are taken on a flat filter sheet, without pleats, wrinkle, creases, etc, at least 14"×14". Particles are then injected across a 1 ft diameter circle of the filter sheet.
3. Orient the material in the test apparatus such that particle hit the same side of the material $1^{st}$ that will see particles $1^{st}$ in the device, if the material has different properties depending on orientation. If the material is non-homogenous across the area, sample representative materials.
4. Run the test with an air filter face velocity chosen to closely match the air filter face velocity in the device based on the air filter surface area used in the device and air flow rate in the device, load to 6 grams of dirt, use ISO Fine A2 dirt (as defined in ISO 12103-1), and load in increments of 0.5 g. Measure resistance after each 0.5 g addition.

The air filter 50 of the present invention has a single pass filtering efficiency of about 20%-70% of E2 particles and about 50-90% of E3 particle as defined by modified single pass ASHRAE Standard 52.2 method below. Single pass filtration properties of a filter may be determined by testing in similar manner to that described in ASHRAE Standard 52.2-2012 ("Method of Testing General Ventilation Air-Cleaning Devices for Removal Efficiency by Particle Size"). The test involves configuring the web as a flat sheet (e.g. without pleats, creases or folds) installing the flat sheet into a test duct and subjecting the flat sheet to potassium chloride particles which have been dried and charge-neutralized. A test face velocity should be chosen to closely match the face velocity in the device based on the filter surface area used in the device and air flow rate in the device. An optical particle counter may be used to measure the concentration of particles upstream and downstream from the test filter over a series of twelve particle size ranges. The equation:

$$\text{Capture efficiency (\%)} = \frac{(\text{upstream particle count} - \text{downstream particle count}) \times 100}{(\text{upstream particle count})}$$

may be used to determine capture efficiency for each particle size range. The minimum efficiency for each of the particle size range during the test is determined, and the composite minimum efficiency curve is determined. From the composite minimum efficiency curve, the four efficiency values between 0.3 and 1.0 μm may be averaged to provide the E1 Minimum Composite Efficiency (MCE), the four efficiency values between 1.0 and 3.0 μm may be averaged to provide the E2 MCE, and the four efficiency values between 3.0 and 10.0 μm may be averaged to provide the E3 MCE. As a comparison, HEPA filters typically have a single pass efficiency above 99% for both E2 and E3 particles.

The air filter 50 may take on a variety of configurations. One configuration for a low cost air filter 50 with high surface area is to fold/seal the air filter material into a shape of a bag instead of a traditional pleated filter with integral frame. An air filter bag can be designed such that it is simple to manufacture as well providing a compact form (via folding) for displaying on store shelf in a flow-wrap or resealable pouch.

Figure 6:
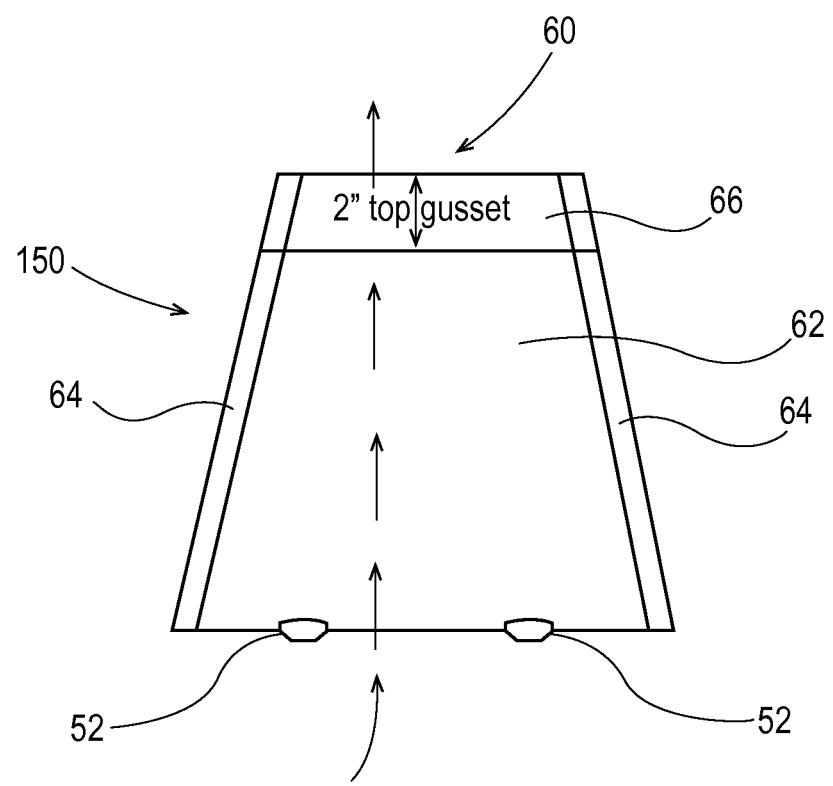
FIG. 6 shows one embodiment of an air filter bag in accordance with the present invention.

FIG. 6 shows one possible air filter bag 150 construction and seal pattern with a gusset 66 that is very similar to a typical stand-up pouch with tapered sides, except the gusset 66 is at distal end 60 (i.e. top) versus a typical pouch where the gusset is on bottom, serving as a base to help the bag stand-up and not fall over. Still referring to FIG. 6, the air filter bag 150 may be formed by folding and heat-sealing two or more edges 64 of the air filter 50, creating a bag or tube-like shape when inflated with air. The air filter 50 may be sealed in a manner that creates a funnel-like shape such that it longitudinally extends from the base 20 and follows the shape of the outer sleeve 80, but does not touch the outer sleeve. To reduce the width at the distal end 60 and enable good air flow between outer sleeve 80 and outer face 62 of the air filter bag 150, a tapered seal and/or a gusset 66 at the distal end 60 may be formed. The air filter bag 150 may include side and/or top gussets that are about 2 cm to about 10 cm, similar to stand-up pouches which are formed prior to sealing to help maintain a unique shape when inflated by fan 40 and help maintain a good spatial gap for air flow between the air filter bag 150 and the outer sleeve 60. The air filter bag 150 may have a nominal diameter of about 10 cm to about 40 cm, or about 10 cm to about 15 cm, or about 20 cm with an upright height of about 35 cm to about 50 cm, or about 40 cm, when expanded, to achieve a surface area of about 0.3 m$^2$. The heat sealed edges 64 and gusset 66 form an air-tight seal, which in some embodiments, withstands more than about 40 g/cm peel force to prevent delamination and/or air flow through unsealed areas.

Outer Sleeve

Still referring to FIGS. 1-3, the device 10 of the present invention includes an outer sleeve 80 longitudinally extending from the base 20. The outer sleeve 80 comprises a first open end 82 into which air enters, a second open end 84 from which air exits, and an air flow path 90 therebetween. The outer sleeve 80 is releasably attached to the base 20 at the first open end 82 and, thus, in air flow communication with the air outlet 24. The outer sleeve 80 envelops the air filter 50 around its longitudinal axis LA. In this way, the direction of air flow in the air flow path 90 generally aligns with the longitudinal axis LA of the air filter 50 and outer sleeve 80. While the outer sleeve 80 shown in FIGS. 1-3 aligns with the longitudinal axis of the device and air filter, it is contemplated that the second open end 84 of the outer sleeve may slightly curve away from the longitudinal axis LA, wherein the second open is angled about 15 to about 30 degrees from the longitudinal axis.

The outer sleeve 80 may have a diameter at the first open end 82 and second open end 84 of about 7 cm to 25 cm, or about 7 cm to about 23 cm, or about 7 cm to about 17 cm, or about 7 cm to about 15 cm. The second open 84 end may be smaller than the first open end 82 where the outer sleeve 80 is tapered at the second end. The outer sleeve 80 may be elongate—longer along the longitudinal axis LA compared to its depth and width. The outer sleeve 80 may be longer along the longitudinal axis LA than the air filter 50 to assist with capturing air flow through the air filter. In one embodiment, the outer sleeve 80 may have a length about 50 cm along the longitudinal axis LA. The outer sleeve 80 may be about 1 cm to about 8 cm longer than air filter 50 to capture air flow exiting the air filter 50 and directing the air downstream at a velocity that will encourage full room circulation.

The outer sleeve 80 may be made of any suitable material that is substantially impermeable to air. Substantially impermeable, as used herein, means the volume of air exiting the outer sleeve at the second open end 84 is at least about 60% of the air entering the outer sleeve at the first open end 82 when the device is in use (i.e. fan is operating). In some embodiments, the outer sleeve 80 is air impermeable such that the volume of air entering the outer sleeve is equivalent to the volume of air exiting the outer sleeve. Additionally, in some embodiments, the outer sleeve 80 may be made of a flexible material, such as woven fabrics used in upholstery or outdoor furniture or umbrellas, non-wovens, polyethylene, polyvinyl chloride, acrylic, or the like, that is capable of collapsing to a generally flat configuration or to less than about 30% of its upright configuration for ease of storage and/or shipment.

It has been learned that there is some advantage of having some low level of permeability of the outer sleeve to provide air dampening. The outer sleeve has between 10 and 40% of the air passing through the outer sleeve to help dampen the sounds from the fan, filter, device system. In addition or alternatively the outer sleeve may be made from a soft and flexible or collapsible fabric like material such as felt, outdoor furniture fabrics, upholstery fabrics, non-wovens and other not rigid materials that helps dampen the sound and being somewhat absorbent of vibrations. This is notably different than most air cleaning systems that use rigid injection molded plastics as the housing and means for directing air and/or sealing around filter.

Figure 7:
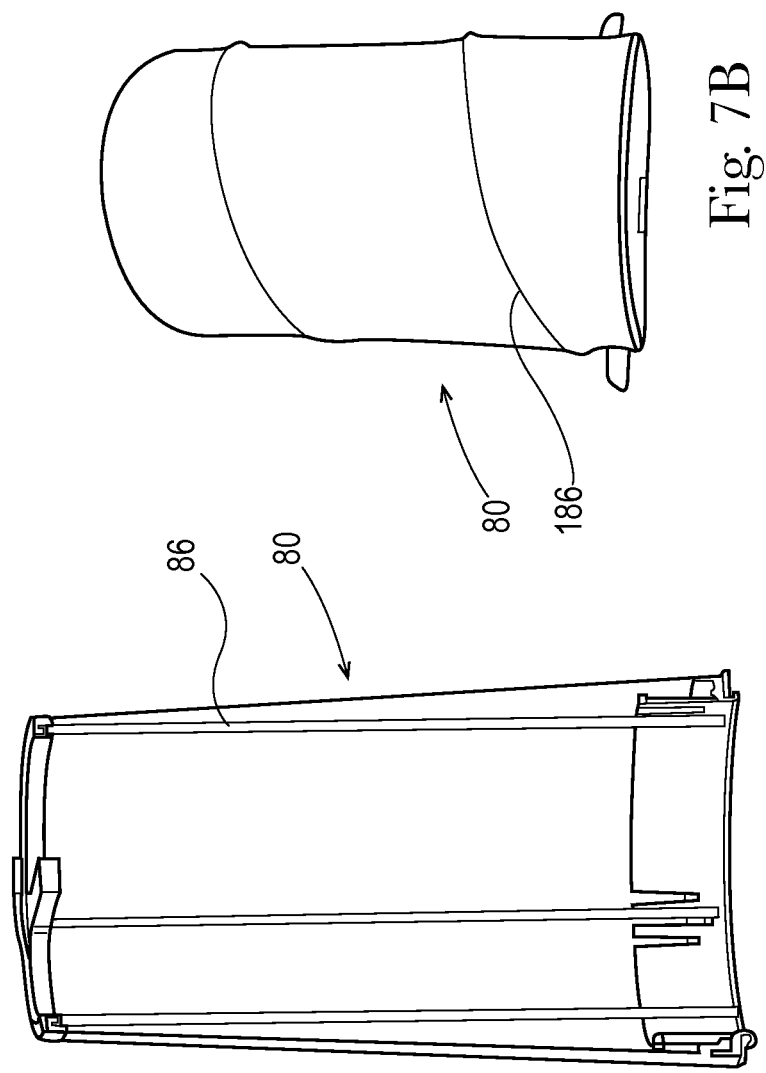
FIG. 7A shows a cut-away section of the outer sleeve, taken along line LA in FIGS. 1 and 2.
FIG. 7B shows another embodiment of an outer sleeve in accordance with the present invention.

Now referring to FIGS. 7a and 7b, the outer sleeve 80 may comprise a frame 86 (which includes hinged frames or assembled frames by the user to aid in collapsing for storage) to hold the outer sleeve 80 in an upright configuration. The hinged frame 86 and the flexible material of the outer sleeve 80 can be optionally folded or compressed flat or rolled to enable compact design for storage. In other embodiments, the outer sleeve 80 is frameless (i.e. free of a longitudinally extending frame). In such embodiments, the outer sleeve may be made of a flexible material that includes an integral coil 186 (as shown in FIG. 7B). Alternatively, the outer sleeve may be frameless and made from flexible, spring-like material that enables the outer sleeve to automatically expand into an upright position (i.e. not collapse) when the outer sleeve 80 is not compressed into a collapsed configuration by the user or in packaging. Suitable materials that are at least substantially impermeable to air, flexible and spring-like include silicon, elastic fabrics, non-wovens. The material may be 0.25 mm to about 5 mm thick. The collapsibility of the outer sleeve 80 enables the device 10 to be packaged in a 26 cm×26 cm×15 cm to a 26 cm×41 cm×15 cm outer package.

Optional Features

A control unit (not shown) may be provided in order to operate the device 10 and, more specifically, the fan 40. The control unit may be pre-programmed or user-programmed to provide pulsing of current or voltage to the emitter. In this way, distribution of droplet size and density may be controlled over time. The voltage time curves produced by the power source may also be synchronized with the fan speed and air flow speed so that optimal particulate collection potentials can be maintained as particulates move through the air filter 50.

Sensors (not shown), chemical or physical in kind, may be used to indicate end-of life of the air filter 50 (i.e. the need for air filter replacement) and/or monitor the quality of air entering and exiting device 10. One approach of providing an end-of-life sensor is with a white or clear tape that is added to the air filter 50. The tape may be the same color as the starting color of the air filter 50 such that it is not visible when new but as the air filter accumulates particulates and becomes dirty, a consumer can visually see a contrast from the aging/dirty filter to the original filter color. Another approach for providing an end-of-life air filter is to heat-seal the fibers of the air filter 50 with a unique pattern such that there is no air flow through the heat-sealed portion of the air filter 50. This heat-sealed portion can be any desired shape and can be colored with ink to match the original starting color as needed. Another approach for an end-of-life signal is to provide filter tabs that engage the device to start a timer that turns on a LED or similar light or sound to remind consumer to change filter. Another unique approach is to provide a "snooze" button that enables or reminds users to check again after some set desired time (1 week, 1 month, etc. . . . ).

Additionally, a sensor may measure air quality. The air quality sensor can be used to turn-on the device 10 or increase the fan speed. The air quality sensor can be disposed proximate to the air inlet 22. The combination of the air quality sensor at the air inlet 22 and the second open end 84 can provide consumers with clear signal of the device's performance and demonstrate its efficacy.

A sensor may also be used to determine the device's orientation, halting its operation if the device 10, for example, is not upright. A sensor may also be used to assess the air flow across device 10 to halt its operation if air inlet 22 or air outlet 24 of the is blocked or there is a malfunction of a fan 40.

The device 10 may include a re-usable or disposable fan pre-filter 42 housed by a fan pre-filter cover 44. The fan pre-filter 42 may be constructed from a reticulated foam, a screen, or variety of other mechanical means to keep large particles or other materials from accumulating on fan blades or motor. The fan pre-filter 42, when used, is placed upstream of the fan 40 to keep fan blades clean.

Device Performance

Exit Velocity

The exit velocity of air leaving the device 10 is also important to provide good air circulation in a room such that filtering will occur in a larger space. For a medium sized room (approx 80 to 140 ft$^2$ with an 8 to 9 ft ceiling), an exit velocity greater than about 0.4 meters per second ("m/s") is desired to move 1 to 10 micron size air-borne particles to the device with air flow in the room. For a larger room (approx. 150-225 ft$^2$ with an 8 to 9 foot ceiling), an exit velocity of about 0.6 m/s or greater is desired. With these velocities the goal is to achieve a room air flow velocity in a significant part of the room that is greater than 0.003 m/s to move airborne particles between 1 to 10 microns to the device where they can be removed by the filter.

Air flow rates in room that are between about 0.003 m/s and about 0.25 m/s are believed good flow rates that will move air-borne particles to the device while also providing good comfort and not providing draft like air movement that might be less desirable by room occupants. This can be achieved when the air flow out of the device 10 is from about 50 to about 150 CFM with an exit velocity of air exiting the exit orifice or second open end 84 may be from about 0.5 m/s to about 3.0 m/s, or from about 0.6 m/s to about 2.6 m/s, or from about 0.7 m/s to about 2.0 m/s. While the fan 40 configuration and the RPM of the fan affects CFM of air, other variables impacting CFM of the device 10 include: air filter surface area, pressure drop of filter media, fan pre-filters, spatial gap between filter and outer sleeve, permeability of outer sleeve, and air flow path upstream and downstream of the fan. This results in an air flow rate of the complete device 10 from about 50 to about 150 CFM, or about 60 to about 100 CFM, or about 70 to about 90 CFM. Where the outer sleeve 80 is completely air impermeable and has an air-tight connection to the base 20, the exit velocity of air exiting the second open end 84 of the outer sleeve 80 can be calculated using the below equation:

$$\frac{\text{Air flow measured } CFM \text{ at the fan inlet}}{\text{Area of exit orifice in (ft}^2\text{)}}$$

Table 1 shows exit velocities using the above calculation.

TABLE 1

| CFM | Exit Diameter | Exit Velocity | |
|---|---|---|---|
| ft3/min | inches | ft/sec | m/sec |
| 50 | 6 | 4.246284501 | 1.294268 |
| 50 | 8 | 2.388535032 | 0.728025 |
| 50 | 10 | 1.52866242 | 0.465936 |
| 75 | 6 | 6.369426752 | 1.941401 |
| 75 | 8 | 3.582802548 | 1.092038 |
| 75 | 10 | 2.292993631 | 0.698904 |
| 100 | 6 | 8.492569002 | 2.588535 |
| 100 | 8 | 4.777070064 | 1.456051 |
| 100 | 10 | 3.057324841 | 0.931873 |
| 150 | 6 | 12.7388535 | 3.882803 |
| 150 | 8 | 7.165605096 | 2.184076 |
| 150 | 10 | 4.585987261 | 1.397809 |

When the outer sleeve 80 and outer sleeve to base 20 connection is completely impermeable, one can use a mass balance with volumetric air flow into fan equal to volumetric flow out thru the exit orifice. The exit orifice used in calculations for exit velocity should be the area of the final area of the device as the air is leaving the device (hence, handles in a top ring handle and/or other obstructions should be not used in the area calculation).

Where the outer sleeve 80 is partially permeable to air, the exit velocity of air exiting the second open end 84 of the outer sleeve can be calculated using the following equation:

$$\text{Exiting air flow through second open end of outer sleeve(in CFM)} \pm \text{area of exit orifice(in ft}^2\text{)}$$

To maintain efficient air flow with minimal pressure drop through the air filter 50, the outer sleeve 80 is positioned radially outwardly from the air filter 50, forming a spatial gap 100. The spatial gap 100 provides a pressure a drop of less than about 8 Pa, or less than about 6 Pa, or less than about 4 Pa, or less than about 2 Pa at 80 to 120 CFM of air. The air filter 50 and the outer sleeve 80 may take on any desired shape (e.g. cylindrical air filter bag circumferentially surrounded by a cylindrical outer sleeve or a squared outer sleeve, etc.). In some embodiments, the spatial gap 100 may be about 3 mm to about 5 mm, or at least 3 mm, or about 12 mm to about 30 mm, or greater than about 20 mm from the air flow surface area of the air filter 50 to the outer sleeve 80. The air flow surface area may include a lower region positioned proximal to the attachment member 52 and an upper region distally located from the attachment member. Where the fan 40 provides a CFM between about 80 to about 100, a suitable minimal spatial gap may be at least about 3 mm at the lower region and the minimum spatial gap at the distal upper region may be at least about 15 mm. The spatial gap 100 enables more air flow through the air filter 50. If the gap is too small, air flow through the air filter may be minimized causing a reduction in CFM from the device 10.

Pressure Drop

The pressure drop of the device 10 (the device may include the housing, air filter, outer sleeve, base, grills, fan, fan pre-filter, and any other components that might limit air flow) is between about 5 and about 25 Pa. A device with a HEPA or HEPA-like filter will typically have a pressure drop much greater than 25 Pa at flow rates greater than 70 CFM. This higher pressure drop results in higher power consumption, typically greater than 25 Watts, in order to deliver greater than 70 CFM with the HEPA or HEPA-like filter. Hence, with the present invention, a fan 40 may be selected that will deliver about 50 to about 150 CFM, while under about 5 to about 25 Pa pressure drop from this device while also keeping the noise of the total device to be less than about 50 dB(A) per the Sound Power measurement described herein, while also operating at a low power consumption of less than 25 Watts.

FIG. 10 shows air flow rates of a fan only, a device with fan and air filter only, and an entire device. From this graph, one can see the air flow with a fan only, without any additional pressure drops from the device is about 110 CFM. When the air filter (nominal 2.5-3 ft$^2$ lay flat surface area) is attached to the fan, the air flow drops to about 95 CFM. Hence, the air filter is providing a pressure drop of about 7 to about 8 Pa. This can be more or less depending on the non-woven material chosen as well as the surface area of the filter bag or any coatings or treatments of the filter surface. When the air flow of the entire device is measured (with the fan activated), a flow rate of about 71 CFM is provided. Hence, the device provides a total pressure drop of about 14 Pa. The volumetric flow rates and pressures of the fan by themselves and in the partial and entire devices can be measured using methods as described in DIN EN ISO 5801:2011-11 The fan curves as shown in FIG. 10 can be generated by adjusting the fan static pressure under the different conditions described.

Low Noise

The device 10, when activated (i.e. with the fan operating), may also provide low noise while delivering good air cleaning performance. The air cleaning performance is driven by the air exit velocity to deliver meaningful full room air circulation, the single pass particle cleaning efficiency of the filter, and the total CFM of the device 10. The noise of the device 10 can be measured by measuring either sound pressure or sound power. The sound pressure level may be less than about 50 dB(A), or less than about 45 dB(A), or less than about 40 dB(A) with ref. 20 uPa. The sound pressure as described herein is measured with a single microphone located 1 m above floor and with 0.2 m horizontal offset from the device axis LA. Alternatively, noise can be measured by measuring the sound power with ref. 1 pW according to a standardized method, e.g., IEC 60704-2-11. In some embodiments, the device 10 is free of noise insulation materials (i.e. any noise insulating parts that are not identified herein as parts, or optional parts, of the device 10).

Filtering Performance

The device 10 of the present invention may filter greater than 30% or from about 40% to about 70% of particulates that are substantially about 0.3 microns to about 10 microns in size; in 20-40 minutes; with a total pressure drop of the device less than about 75 Pa, or less than about 25 Pa, or less than about 20 Pa, or less than about 10 Pa, or less than about 9 Pa; at an air exit velocity from about 0.1 to about 4.0 m/s, or from about 0.5 m/s to about 3 m/s, or about 0.8 m/s to about 3 m/s, or about 0.8 m/s to about 2.6 m/s, or about 0.6 m/s to about 2.6 m/s, or about 0.8 m/s to about 1.8 m/s, or about 0.7 m/s to about 2.0 m/s); and an air flow rate greater than about 70 CFM, or from about 70 CFM to about 150 CFM. For particles that are greater than 1 microns, the device 10 of the present invention can filter greater than 50% of particles in 20 minutes; with a pressure drop within the device of less than about 25 Pa, or less than about 15 Pa, or less than about 10 Pa; at an exit velocity of about 0.5 m/s to about 3 m/s; and an air flow rate greater than 70 CFM, or from about 70 FM to about 150 CFM. Filtering efficiency of an air filtering device can be determined by using the method described in ANSI/AHAM-1-2006), as modified in the Examples herein.

EXAMPLES

Particulate Removal

A device and air filter in accordance with the present invention were constructed for testing particulate removal performance in a room. The base was approximately 25 cm×25 cm×3 cm and involved incorporating four Noctua NF-P12 (120 mm×25 mm) fans into the base with four holes of approximately 120 mm diameter to enable air flow such that all fans were blowing air in same direction (upward from the resting surface). The four fans were electrically connected together with the proper splice and then powered with a 12V DC power supply from a plug-in voltage transformer (McMaster-Carr part #70235K95). The 25 cm×25 cm×3 cm base also had four posts mounted on each corner to elevate the device 10 cm off the floor. On the top of the device, an air filter bag is mounted with a circumference of approximately 102 cm and elastic means to hold the air filter bag onto the device.

A second device was made with a higher powered fan to deliver more pressure by replacing the four Noctua fans utilized in the first device with a single larger diameter fan (Silverstone S1803212HN, at a diameter of approximately 18 cm) with an opening matching the diameter of the Silverstone fan. This second device also had 10 cm legs to support fan off the floor without restricting air flow. The Silverstone fan assembly had a separate DC power supply that could be varied between 8 and 15 volts to change the air flow rate and pressure.

Four different bags were made by folding air filter material and heat-sealing with a Vertrod Impulse bar sealer in the same manner many plastic bags are made (e.g. a potato chip bag). The bags were made with two different materials and two different sizes (which affects the filter face velocity for a given flow rate). One material was a 60 gsm hydroentangled non-woven comprised predominately of PET fibers and a 17 gsm spunbond PP non-woven in the middle ("60 gsm HET"). The other material was a 59 gsm laminate consisting of 32 gsm PP melt-blown with a 10 gsm spunbond PP on one side and a 17 gsm PP spunbond on the other side ("59 gsm SMS").

1. 60 gsm HET small bag—102 cm circumference× approx. 38 cm tall—total filter surface area air flow when inflated of approximately 400 in$^2$ due to the tapering of the bag design.
2. 60 gsm HET large bag—102 cm circumference× approx. 66 cm tall—total filter surface area air flow when inflated of 800 in$^2$ due to the tapering of the bag design.

3. 59 gsm SMS small bag (used the Silverstone fan due to higher pressure required)—same size as the 60 gsm HET small bag above.
4. 59 gsm SMS large bag (used the Silverstone fan due to higher pressure required)—same size as the 60 gsm HET large bag above.

The air filter bags are attached to the top of the base which contains a flange to hold the bag and force all the air from the four fans to inflate the bag with all air passing through the filter bag and little or no by-pass. The air filter bags, when inflated, resemble a tube where it's attached to the base and the tube then comes to a point where the top seal is made.

On the outside of the air filter bag is attached an impermeable paper sleeve to capture all the air flowing through the air filter bag and forcing it out the top to increase the exit velocity from the device. The outer sleeve is approximately 25 cm×25 cm collapsible paper outer sleeve from Ikea (Orgel Vreten™ lamp shade). The outer sleeve is attached to the device such that it is sealed around the base and having the filter bag inside. Two different outer sleeve heights are made. For the short bags, a 23 cm tall outer sleeve and for the tall bags a 66 cm tall outer sleeve is used. When looking from the top of the assembled device one would see the filter bag centered over the device with a 5 mm to 10 mm gap on all sides to enable air flow. The device with the filter bag and outer sleeve are then tested for air flow rate through the entire device by measuring the exit velocity at the top (i.e. second open end) of the outer sleeve and then dividing by the air flow surface area to get a target flow rate. The desired flow rate for the tests is 80 CFM for the small bags and 100 CFM for the tall bags. Table 2 captures the test conditions that are reported in FIG. 8.

normalized to compare all seven variables as a percent reduction. Between each test, a HEPA air cleaner was used to get the particle counts to a very low level as described in the method.

Figure 8:
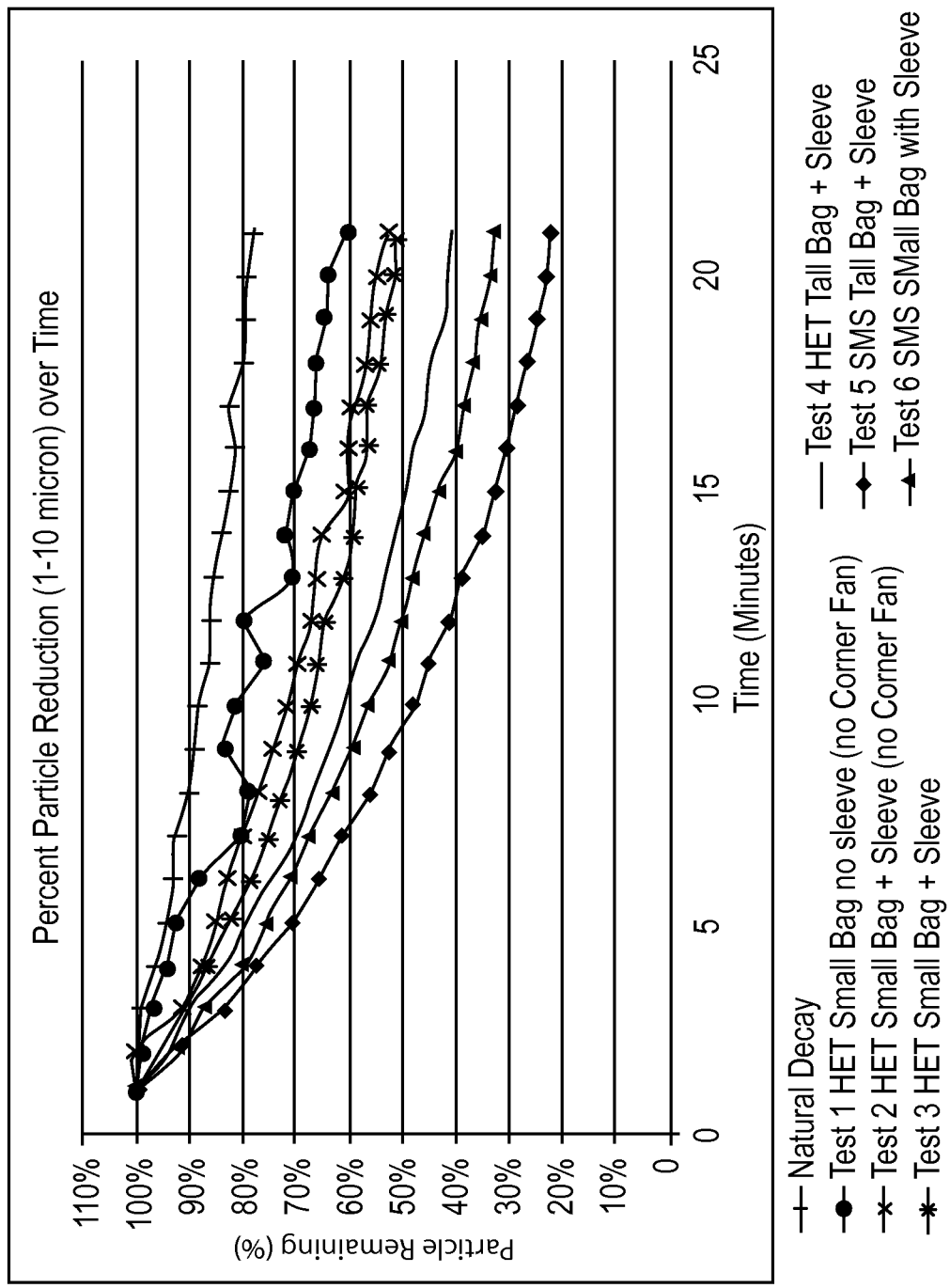
FIG. 8 is a graph showing the particle reduction over time using an air filtering device in accordance with the present invention.

Using this method and measuring 1 to 10 micron particles, the natural decay in 20 minutes for 1 to 10 micron size particles is about 21% with no device running. In contrast, when the device described in this example was running, the particles in room are reduced from about 40% to up to 80% depending upon the device, filter, and room set-up conditions. The larger bag enabled higher air flow rate (100 CFM) and higher single pass efficiency filter (i.e. 59 gsm SMS). The higher efficiency 59 gsm SMS filter required higher voltage with the Silverstone fan. In general, FIG. 8 shows that higher flow rate and higher efficiency both increase filtering performance. Another plot shown in FIG. 8 shows the impact of the outer sleeve when no corner recirculating fan is on. Normally with the aforementioned ANSI/AHAM method, a high flow rate recirculating fan (greater than 250 CFM/4.25 $m^3$/min) is circulating the air in the room during the test. This creates a good mixing of the particles in the room but is not always representative of what would exist in a home. Hence, the test was conducted with the recirculating corner fan, noted in the ANSI/AHAM method, turned off and comparing the benefit with and without the outer sleeve. In this case, there is a 10%+ increase in filtering performance (approx. 50% instead of 40% particle removal for the device with a sleeve vs. without a sleeve) since the outer sleeve increases the exit velocity from the device to cause more air flow circulation in the room and hence remove more particles. With a larger air filter bag and outer sleeve the impact is even greater for a given fan since the difference between exit velocity and filter face velocity increases. The

TABLE 2

| | Fans | Filter Type | Filter Size | Outer Sleeve | Corner Room Fan On | TARGET CFM\ VOLTAGE, Amps, Power Req'd | PLACEMENT | AVG Temp (° C.) | AVG Humdity (% RH) |
|---|---|---|---|---|---|---|---|---|---|
| 1 | Noctua NF-P12 | HET | Small | SHORT | Yes | 80\12 V .5 A\5.5 W | FLOOR | 21.11 | 36 |
| 2 | Noctua NF-P12 | HET | Small | SHORT | No | 80\12 V .5 A\5.4 W | FLOOR | 21.11 | 42 |
| 3 | Noctua NF-P12 | HET | Small | NONE | No | 80\12 V .5 A\5.4 W | FLOOR | 21.11 | 37 |
| 4 | Noctua NF-P12 | HET | Tall | TALL | Yes | 100\12 V .5 A\5.3 W | FLOOR | 21.67 | 39 |
| 5 | SILVER STONE | SMS | Tall | TALL | Yes | 100\15 V .5 A\22.4 W | FLOOR | 21.67 | 44 |
| 6 | SILVER STONE | SMS | Small | SHORT | Yes | 80\15 V .5 A\24.4 W | FLOOR | 21.67 | 37 |

The device was then placed in a room that is about 3 m×3 m×3 m similar to that described in ANSI/AHAM AC-1-2006 with Arizona road dust (Fine Air Cleaner Test Dust sourced from PTI Inc.). A suitable room and testing facilities for such testing can be found at Intertek testing facilities in Cortland, N.Y. A standard concentration of dust (typically about 200-400 particles/cc) was generated in the room as described in Section 6 of the aforementioned ANSI/AHAM method. The device is turned on per the procedure and the particles from 1 to 10 microns are measured over a 20 minute time period and plotted as shown in FIG. 8. In addition to the six tests, a natural decay was also recorded to illustrate the particles natural decay with no air filtering device in the room. All six tests and the natural decay test had a similar level of starting particles in room before the device was turned on but were particle reduction in the room due to air circulation of the device will be impacted as well by how close the particle counter is to the test device. If the particle counter is close to the device then the impact of turning off the recirculating fan will be less. If the particle counter is closer to the corners of the room when the recirculating fan is off, then the impact of the exit velocity (i.e. having outer sleeve) will be higher. The particle counter was about 1.2 m from the air filtering device being tested. If further placed away, the difference between the no-sleeve and presence of a sleeve would be greater since the air velocity needed to suspend and move particles towards the device is greater.

Effect of Varying Spatial Gaps

Four air filtering devices are constructed: (1) a 23 cm×23 cm×66 cm outer sleeve device having an air filter bag in which about 30% of the air flow surface area is in contact with the outer sleeve; (2) a 25×25×66 cm outer sleeve device and (3) a 30×30×66 cm outer sleeve device both having air filter bags that do not touch the outer sleeve (the latter having a larger spatial gap between the air filter bag and the inside wall of the outer sleeve than the former); and (4) a device without an outer sleeve. The larger the spatial gap, the lower the pressure drop. Although no outer sleeve is beneficial with respect to pressure drop, lacking an outer sleeve has inferior performance in capturing enough air to provide the necessary exit velocities for the device to filter air in a room.

The four constructed devices are operated with the same fan—four Noctua 12 V fans—providing 80 to 120 CFM of air at 4 to 8 Pa. The air flow and pressure can be calculated by testing the device with the fan using the methods described in DIN EN ISO 5801:2011-11. In the test, the air inlet side of the fan or the inlet side of the device (fan, air filter, outer sleeve assembly) or the inlet side of the system (fan, filter, sleeve assembly) is attached to the testing rig, blowing the air outwardly from the testing rig to a free space.

Figure 9:
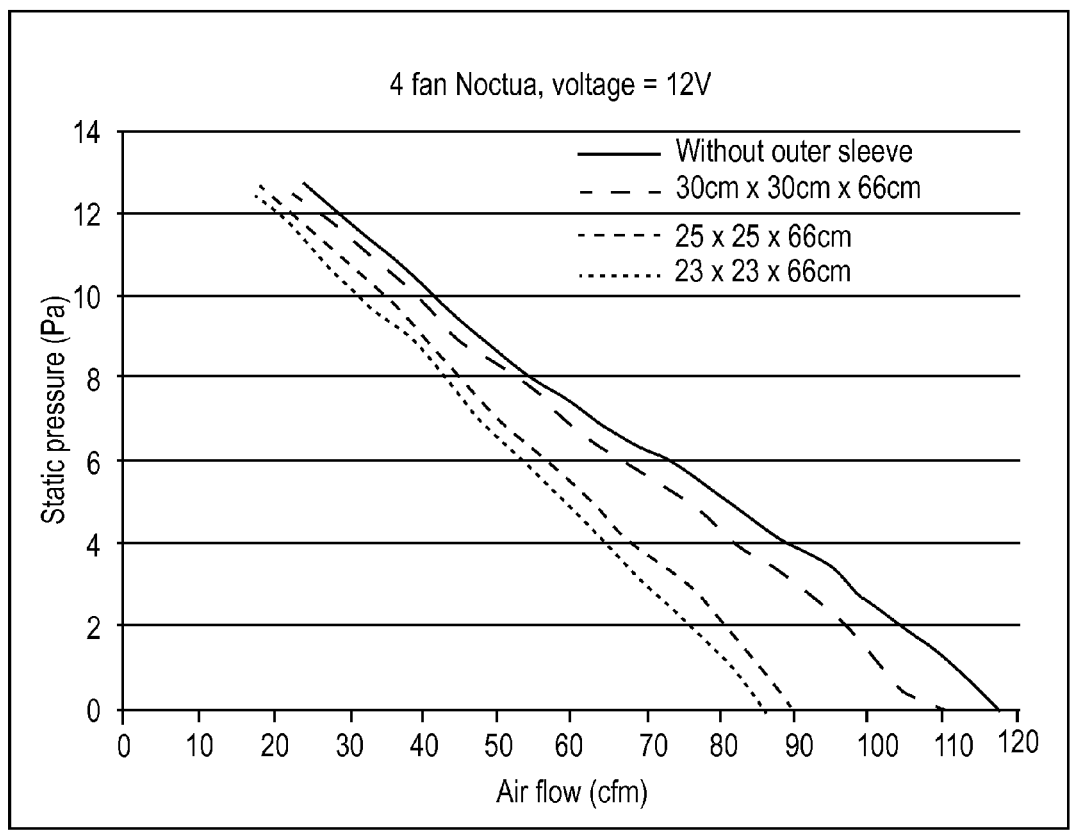
FIG. 9 is a graph showing the static pressure and air flow rates of an air filtering device, in accordance with the present invention, and the pressure drops within the device associated with having varying spatial gaps between the air filter and outer sleeve.

FIG. 9 shows the relationship between the quantity of air (i.e. CFM) the fan delivers and the pressure generated at various air quantities. CFM is presented along the x-axis. Pressure, the term used to identify the "push" needed to overcome the system's resistance to airflow, is presented along the y-axis. Typically, for a given fan power, as back pressure increases, flow rate decreases. This curve is constructed by plotting a series of pressure points versus specific flow rates.

FIG. 9 also shows the characteristic of the present four fan device and different air flow resistances. These different air flow resistances are generated by different spatial gaps around the air filter. The highest flow rate will be achieved without any additional parts like an outer sleeve around the filter. Outside the filter is only free air, but there is no direction of air flow defined without an outer sleeve. An outer sleeve will guide the air flow in a defined direction and will increase the air flow resistance and, with that, the pressure drops inside the device. A smaller spatial gap between outer sleeve and filter increases the air velocity but reduces the air flow. It is necessary to optimize these parameters (air velocity, flow rate, pressure drop) to obtain an air flow which is able to fulfill the requirements in terms of filtering performance. As seen in FIG. 9, the smallest outer sleeve—23 cm×23 cm×66 cm—throttles down the air flow because the spatial gap is nearly zero in most of gap areas between the outer face of the air filter and the inside surface of the outer sleeve.

Throughout this specification, components referred to in the singular are to be understood as referring to both a single or plural of such component.

Every numerical range given throughout this specification will include every narrower numerical range that falls within such broader numerical range, as if such narrower numerical range were all expressly written herein. Further, the dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm"

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An air filtering device comprising
    a base having an air inlet and an air outlet;
    a fan functionally attached to said base, wherein said fan is capable of moving air through said air outlet;
    an air filter bag in air flow communication with said air outlet and comprising an air flow surface area from which air exits said air filter bag when said device is in use, wherein the air filter bag is foldable;
    a substantially air impermeable outer sleeve comprising a first open end, a second open end, and an air flow path therebetween, wherein said outer sleeve is in air flow communication with said air outlet, and wherein said outer sleeve envelops said air filter bag around its longitudinal axis and defines a spatial gap between said air filter bag and said outer sleeve;
    wherein the air flow rate in said air flow path is about 80 to about 100 CFM and the pressure drop at said spatial gap is less than about 8 Pa.

2. The device of claim 1, wherein the minimum spatial gap is about 3 mm.

3. The device of claim 1, wherein said air flow surface area of said air filter bag comprises a lower region and an upper region positioned along a longitudinal axis, wherein the minimum spatial gap at said lower region is at least about 3 mm and the minimum spatial gap at said upper region is at least about 15 mm.

4. The device of claim 1, wherein the exit velocity of air exiting said second open end of said outer sleeve is about 1 m/s.

5. The device of claim 1, wherein where the face velocity of air exiting said air filter bag is about 25 to about 50 fpm.

6. The device of claim 1, wherein said air filter has an air flow surface area of about 0.2 $m^2$ to about 1 $m^2$.

7. The device of claim 1 wherein the air flow rate exiting said second open end of said outer sleeve is at least 80% of the air flow rate entering said first end of said outer sleeve.

8. The device of claim 1, wherein said pressure drop of said device is less than about 5 Pa.

9. The device of claim 1, wherein said device comprises a backpressure of less than about 25 Pa.

10. The device of claim 1, wherein said fan provides an air flow rate of about 80 to about 100 CFM, at about 15 to about 25 Pa of pressure, when activated.

11. The device claim 1, wherein said device has a noise level of less than about 45 db.

12. The device of claim 1, wherein said outer sleeve is air impermeable.

13. The device of claim 1, wherein said outer sleeve comprises a flexible air impermeable material.

14. The device of claim 1, wherein said outer sleeve is constructed from a flexible material.

15. The device of claim 14, wherein said outer sleeve has an upright position volume 70% greater than a collapsed position volume.

16. The device of claim 1, wherein said base comprises a tapered shroud having a first step for receiving said air filter and second step for receiving said first open end of said outer sleeve.

17. The device of claim 1, further comprising an air quality sensor.

18. The device of claim 1, further comprising an end-of-life sensor.

* * * * *